United States Patent [19]

Mitsui et al.

[11] Patent Number: 5,611,942
[45] Date of Patent: Mar. 18, 1997

[54] METHOD FOR PRODUCING TIPS FOR ATOMIC FORCE MICROSCOPES

[75] Inventors: Tadashi Mitsui, Wappingers Falls; Katsuya Okumura, Poughkeepsie, both of N.Y.

[73] Assignee: Kabushiki Kaisha Toshiba, Kawasaki, Japan

[21] Appl. No.: 397,617

[22] Filed: Mar. 2, 1995

[51] Int. Cl.$^6$ ................ H01J 37/00; B44C 1/22
[52] U.S. Cl. ................ 216/67; 216/66; 216/79; 216/81; 156/643.1; 250/306; 250/307; 250/423 F
[58] Field of Search ................ 216/67, 79, 81, 216/66; 156/643.1, 647.1, 651.1, 653.1, 657.1, 662.1; 250/423 F, 306, 427, 307

[56] References Cited

U.S. PATENT DOCUMENTS

| | | |
|---|---|---|
| 4,968,585 | 11/1990 | Albrecht et al. . |
| 5,116,462 | 5/1992 | Bartha et al. . |
| 5,171,992 | 12/1992 | Clabes et al. . |
| 5,242,541 | 9/1993 | Bayer et al. . |
| 5,282,924 | 2/1994 | Bayer et al. . |

FOREIGN PATENT DOCUMENTS 0413041  2/1991  European Pat. Off. .

OTHER PUBLICATIONS

"Two–dimensional Atomic Force Microprobe Trench Metrology System", D. Nyyssonen et al., *J. Vac. Sci. Technol.*, B 9(6), Nov./Dec. 1991, pp. 3612–3616.

*Primary Examiner*—Thorl Chea
*Attorney, Agent, or Firm*—Banner & Witcoff, Ltd.

[57] ABSTRACT

The present invention is a method for forming a three point atomic force microscope tip. The method includes forming a substantially longitudinally extending solid tip having a peripheral surface and a forward end surface. Three masks are formed by deposition of carbon upon the solid tip, with a first and second of the masks formed along the peripheral surface, and a third of the masks formed on the forward end surface. The mask covered tip is then etched for a predetermined period of time to remove material from both the tip and the mask. After the predetermined period of time has elapsed, the masks are completely removed, and the removal of material from the tip results in the formation of three spikes which are pointed to the location from which the masks were removed.

23 Claims, 5 Drawing Sheets

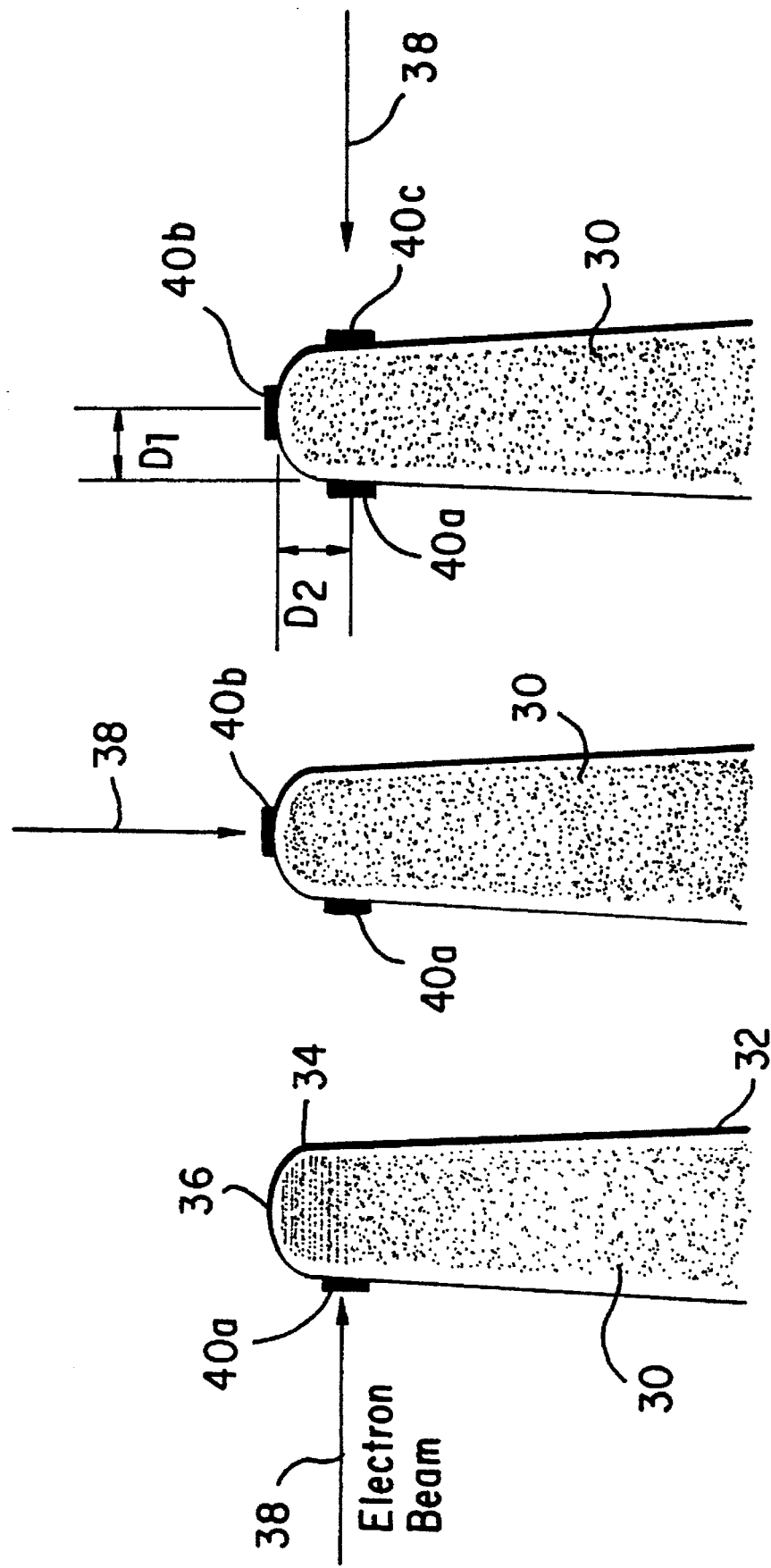

5,611,942

METHOD FOR PRODUCING TIPS FOR ATOMIC FORCE MICROSCOPES

FIELD OF THE INVENTION

The present invention is directed to a method of producing silicon tips for use in atomic force microscope (AFM) technology, and in particular, to a method of producing three-point AFM tips.

BACKGROUND OF THE INVENTION

Atomic force microscopy is a technique for measuring extremely small dimensions, which takes advantage of the small forces created between the extreme end of an ultrafine tip and a surface which is to be measured or profiled. AFM may be used in the production of integrated circuit (IC) chips to measure the critical dimensions of the various components of the circuit, for example, the linewidth of the features of the IC wafer. This technique is known as AFM micrometrology and is becoming of increasing importance since as the scale of integration increases, there is a corresponding decrease in the dimensions of the features of the IC wafer which must be measured or profiled.

One type of AFM makes use of ultrafine tips which are mounted on spring-like cantilevers. As the tip is brought closer to the surface which is being profiled, the force between the surface and the tip causes the tip to deflect the cantilever. The degree of deflection may be measured to resolve the features of the surface. However, the use of this technique with conventional AFM tips to accurately profile deep structures such as trenches formed on IC wafers is limited. A conventional tip such as parabolic tip 1 shown in FIG. 1a loses resolution as the radius of the probe increases with depth, leaving a "dead zone" between the lower regions of the tip and the inner edge of the trench, which results in a loss of information about the inner edge of the trench. Conventional needle tips such as tips 3 shown in FIG. 1b provide better resolution. However, needle tips are extremely vulnerable to being damaged or broken, for example, due to crashes with the vertical edges of the trench.

In order to overcome these drawbacks in micrometrology of deep trenches, three-point tips such as tip 5 shown in FIG. 2 have been developed. Tip 5 is disposed in a trench. Such tips may be vibrated in two dimensions using piezo-electric elements, with the tip held stationary except for the vibration, and the surface to be profiled moved towards the tip. When the surface is close enough to the tip to result in creation of interactive forces, the tip vibration is damped. Damping of the vibration is therefore indicative that the surface of the trench is a certain distance from the tip at that particular location of the trench. By repeating the process at different locations, the relative depth of the trench at different locations can be determined to obtain a surface profile. This technique is discussed in Nyyssonen et at, "Two-dimensional Atomic Force Microprobe Trench Metrology System ", *Journal of Vacuum Science Technology*, B9(6), November/December 1991, pp. 3612–16.

In order to use this technique, tips 5 must have three points, one each for sensing the bottom surface and the right and left edges. The overall width w of the tip determines the smallest trench width which may be measured, the longitudinal distance d from the widest point of the tip to the bottom of the tip measures how close to the bottom of a trench a width can be measured, and the lateral distance D between the location of the tip at its widest extent and the location of the tip at its narrowest extent determines the limit of undercut which can be determined accurately. The smaller these dimensions can be made, the more accurate the resulting profile.

One technique for forming a three point tip is disclosed in U.S. Pat. No. 5,171,992, to Clabes et at, incorporated by reference. With reference to FIG. 3, conventional silicon probe tip 10 which serves as a substrate is manufactured in a conventional manner, for example, by known techniques for selective etching and undercutting. Such techniques are disclosed in Albrecht et al "Microfabrication of Cantilever Styli for the Atomic Force Microscope", *Journal of Vacuum Science Technology*, A8(4), July/August 1990, pp. 3386–3396. Thereafter, conical needle-shaped tip 18 is formed on forward surface 14 of substrate by conventional electron beam chemical vapor deposition (CVD).

In CVD, substrate 10 is disposed in an evacuated chamber of a conventional electron beam unit. An organo-metallic compound gas stream is introduced into the chamber, and electron beam 12 is applied to forward surface 14 of silicon substrate 10. Electron beam 12 causes decomposition of the gas, and preferential deposition of the decomposed products onto surface 14. As the process continues, layers of the decomposed products build up on surface 14 to create tip 18. Tip 18 includes a carbon matrix in which metal particles are dispersed, that is, tip 18 is organo-metallic.

In order to form a three-point tip, the process described above with reference to FIG. 3 is performed until shank 20 is formed on a substrate, as shown in FIG. 4a. Thereafter, beam 12 is moved sideways in successive steps from the center of shank 20 to begin lateral buildup of organometallic material and thereby form side point 20a, as shown in FIG. 4b. The geometry of side point 20a will depend upon the intensity of the electron beam, beam size, separation between successive horizontal steps, the duration of the beam at each step and the total number of steps. When the desired length of point 20a is reached, electron beam 12 is returned to the center of shank 20, and is stepped in the opposite direction to form point 20b as shown in FIG. 4c. Finally, electron beam 12 is returned to the center of the forward surface of shank 20 to form center point 20c to form a complete three point tip. FIG. 4e is a photomicrograph showing various three-point tips formed by using this prior art technique.

Though useful in forming three-point AFM tips for critical dimension measurements, use of the CVD technique described in Clabes results in tips having dimensional limitations. For example, in order to achieve the desired levels of accuracy in measurements of trench critical dimensions, it is necessary to manufacture AFM tips in which the points can be manufactured to have a length of less than 1,000 Å, with the tips having an overall maximum diameter of less than 2,000 Å, for a trench having a depth of 0.25 μm. It is difficult to control the known techniques of using CVD to form three-point tips so as to obtain points having the desired dimensions. Further, the organic-metallic nature of the three-point tips made by the known techniques using CVD is less desirable than three-point tips manufactured of substantially pure silicon.

SUMMARY OF THE INVENTION

The present invention is a method for forming a three point atomic force microscope tip. The method includes forming a substantially longitudinally extending solid tip having a peripheral surface and a forward end surface. Three masks are formed upon the solid tip, with a first and second of the masks formed along the peripheral surface, and a third of the masks formed on the forward end surface. The mask covered tip is then etched for a predetermined period of time to remove material from both the tip and the mask. After the predetermined period of time has elapsed, the masks are completely removed, and the removal of material from the tip results in the formation of three spikes which are pointed to the location from which the masks were removed.

BRIEF DESCRIPTION OF THE DRAWINGS

FIGS. 5a–5c are side views showing the carbon deposition step for forming a three-point probe according to the present invention.

DETAILED DESCRIPTION OF THE PREFERRED EMBODIMENTS

Figure 1A:
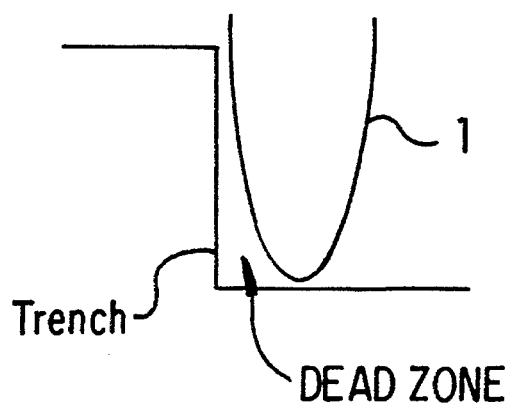
FIGS. 1a and 1b are side views showing conventional AFM probes disposed in a trench.
Figure 1B:
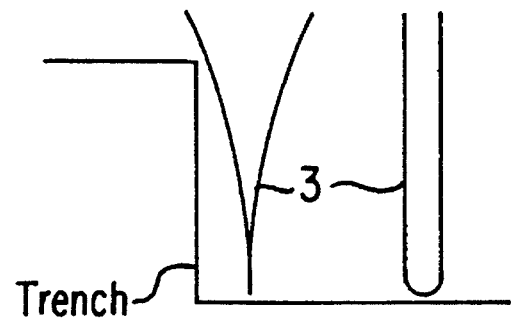
Figure 2:
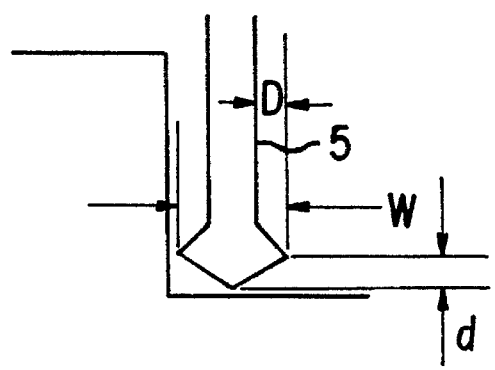
FIG. 2 is a side view showing a three-point AFM probe disposed in a trench.
Figure 3:
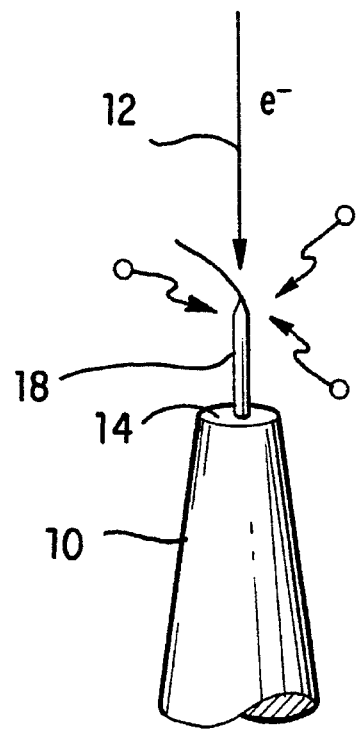
FIG. 3 is a perspective view showing a conventional silicon probe having a needle-shaped tip formed on the forward surface.
Figure 4A:
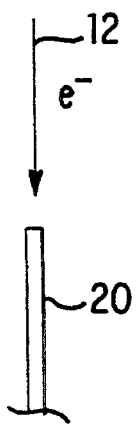
FIGS. 4a–4d are side views showing formation of a three-point probe by a conventional CVD technique.
Figure 4B:
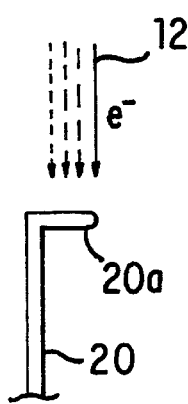
Figure 4C:
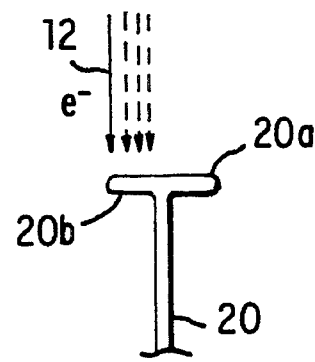
Figure 4D:
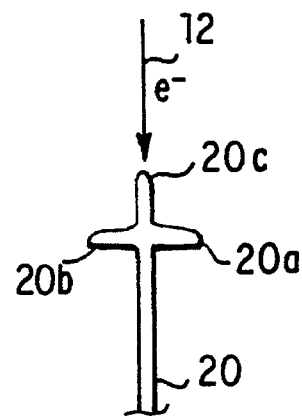
Figure 4E:
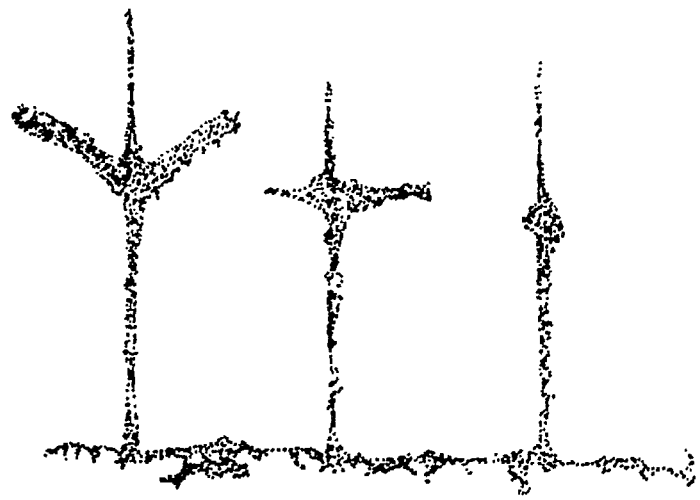
FIG. 4e is a photomicrograph showing various three-point tips formed by using the prior art CVD technique.

With reference to FIGS. 5a to 5c and 6a to 6b a method for producing AFM tips according to the invention is illustrated. FIG. 5a shows solid silicon tip 30 formed by conventional methods, for example, the microfabrication techniques discussed in the above-referenced article by Albrecht et at. These techniques for forming tip 30 do not form part of the present invention. Tip 30 has a circular peripheral surface which is tapered generally uniformly from base 32 to forward end 34 so as to give tip 30 a generally frustrum shape. The taper increases at end 34 so that tip 30 is rounded at forward end 34 into relatively flat forward end surface 36. Preferably, the diameter of tip 30 is about 2,000 Å at the base 32 and decreases slightly from the base 32 to the end 34 as shown in FIG. 5a.

With further reference to FIG. 5a, a carbon mask is formed on tip 30 by disposing tip 30 within the evacuated chamber of a conventional electron beam unit. The electron beam unit may be a conventional scanning electron microscope SEM adapted to include a gas supplier and a tilt stage. A volatile gas stream is introduced into the chamber. The gas must be an organic compound, and in a preferred embodiment is $CF_4$. Electron beam 38 is turned on and impinges upon end 34 of tip 30 at a location near base surface 36. Beam 38 causes decomposition of the gas and deposition of the decomposed carbon onto the surface of tip 30. The carbon deposition occurs within the region irradiated by beam 38, and a radial distance out therefrom due to electron scatter from the surface.

As a result of the carbon deposition, circular or disc-shaped carbon mask 40a is formed on the surface of tip 30 near end 34. The thickness and diameter of mask 40a will depend upon the diameter of the beam, the electron density, and the acceleration rate of the electrons, which further depends upon the applied voltage. Each of these variables will be controlled to form carbon mask 40a having the desired thickness and diameter. As explained below, the thickness and diameter of mask 40a and masks 40b and 40c ultimately will determine the final shape of the formed three-point tip. In a preferred embodiment, beam 38 has a diameter of less than 500 Å, a primary beam acceleration voltage of 20 keV, a beam current of 30 pA, and impacts tip 30 at a location from end surface 36 which is approximately equal to the diameter of the beam, in this case, about 500 Å. Beam 38 will be applied for a duration of approximately 15 minutes. Under these conditions, mask 40a will have a diameter slightly larger than that of the beam, for example, about 500 Å, and a thickness of approximately 1 Å.

Thereafter, tip 30 is rotated so as to bring surface 36 into a position where it is perpendicular to beam 38, as shown in FIG. 5b. Tip 30 again is impinged upon by electron beam 38 to form disc-shaped carbon mask 40b on surface 36 of tip 30. Finally, tip 30 is rotated again so as to bring the surface of tip 30 opposite mask 40a into a position where it is perpendicular to beam 38, as shown in FIG. 5c. Tip 30 again is impinged upon by beam 38 to form mask 40c. In general, each tip 30 will be subjected to electron beams having the same operating characteristics so as to form masks 40a–40c having the same diameters and widths.

Figure 6A:
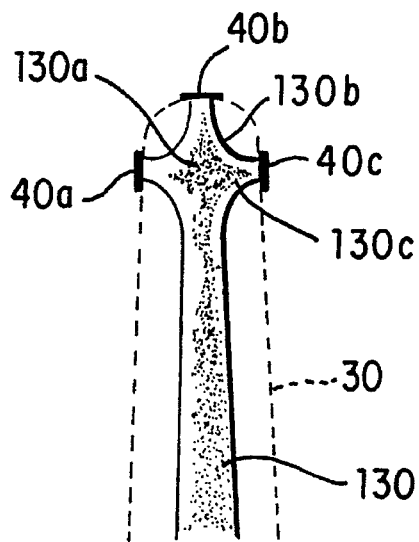
FIGS. 6a–6b are side views showing the etching step in forming a three-point probe according to the present invention.
Figure 6B:
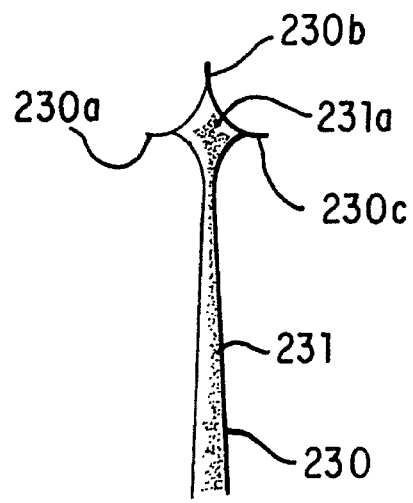

With reference to FIGS. 6a–6b, after masks 40a to 40c are formed on top 30, tip 30 is then etched to remove a predetermined quantity of the silicon. During etching, carbon masks 40a to 40c serve as protective coverings and preclude surface removal of the silicon at the locations of masks 40a to 40c. Instead, the silicon of tip 30 can be removed at these locations only by undercutting the surface of tip 30.

As a result of the etching process and the provision of masks 40a to 40c, the silicon near forward end 34 of tip 30 is removed in a parabolic manner at the location between masks 40a and 40b, and between masks 40b and 40c. In other words, end 34 of tip 30 is caused to have the general shape of a parabola extending between masks 40a and 40b, and between masks 40b and 40c such that the masks are undercut. A similar parabolic surface is created between mask 40a and 40c and the portion of tip 30 below these masks. As the etching proceeds, the surface is continually removed in a parabolic manner. As shown in FIG. 6a, after a certain period of time has elapsed, the parabolic removal of silicon results in the creation of intermediate tip 130, having preliminary spikes 130a to 130c, which are centered upon masks 40a to 40c. The carbon atoms in masks 40a–c also are removed by the etching process, although at a much lower rate than the silicon. Thus, the thickness of masks 40a to 40c decreases as well.

The shape of the tip at the end of the etching process is shown in FIG. 6b. At this point, tip 30 has been transformed into three-point tip 230. Three-point tip 230 includes tapered longitudinally extending section 231 including diamond-shaped head 231a. Spikes 230a and 230c extend outwardly from opposite sides of head 231a, along an axis which is substantially normal to the longitudinal axis of tapered section 231. Spike 230b extends substantially along the longitudinal axis of tapered section 231. All of masks 40a to 40c are removed by the etching process.

Spikes 230a to 230c have points which generally correspond to the location of the centers of removed carbon masks 40a to 40c. Spikes 230a to 230c have a conical shape. With reference to FIG. 5c, preferably the length of the spikes 230a and 230c are less than distance D2, and the length of spike 230b is less than distance D1. Of course, the final shape and dimensions will depend on the duration of the etching process, as well as the shape and dimensions of carbon masks 40a to 40c. These factors will be determined by one skilled in the art in dependence upon the desired shape and dimensions of tip 230 and spikes 230a to 230c. In general, masks 40a to 40c will need to have a thickness of at least 1 Å in order to withstand the etching process long enough to allow formation of spikes 230a to 230c. However, in practice, the masks may have a thickness of up to 10 Å and still be removed entirely by the etching process.

The etching may be performed by either a dry or wet etching process. However, the etching should be anisotropic so as to allow for greater etching rates at certain locations along tip 30. One suitable technique would be a conventional planar plasma etching process. Tip 30 having masks 40a to 40c would be disposed in a chamber filled with a reactive gas. In a preferred embodiment, the reactive gas would include a fluorine compound. An RF field is applied to the chamber to energize the reactive gas to the plasma state, in which the fluorine attacks the silicon and the carbon, converting it to volatile components which are removed from the chamber by the vacuum system. Preferably, the plasma etching will be performed in the same chamber as the carbon deposition, with the same gas used for both deposition and etching, for example, $CF_4$.

As an alternative to plasma etching, the silicon and carbon could be removed by ion beam etching, in which the silicon atoms and carbon would be removed due to the impact of ionized gas particles upon the surface of the tip. Reactive ion etching, which is a combination of plasma and ion beam etching also could be used. As a further alternative, a wet etching process could be used, in which the carbon-masked tip would be immersed in or sprayed with a wet solvent. As an example, the solvent could be KOH.

As discussed, the final shape and dimensions of three-point tip 230 are determined by three factors: 1) the length of time the tip is subjected to the etching process; 2) the etching process used 3) the diameters and thicknesses of carbon masks 40a to 4c; and 4) the location of the masks on the tip. In a preferred embodiment in which a plasma etching process is used, masks 40a to 40c will have a diameter of about 500 Å and thickness of about 10 Å, and the deposition and etching gas will be a mixture of $CF_4$ and $O_2$ having a volume ratio of 2.5:1, and the tip would be etched for a duration 15 seconds, depending on the particular conditions encountered during etching.

Figure 7:
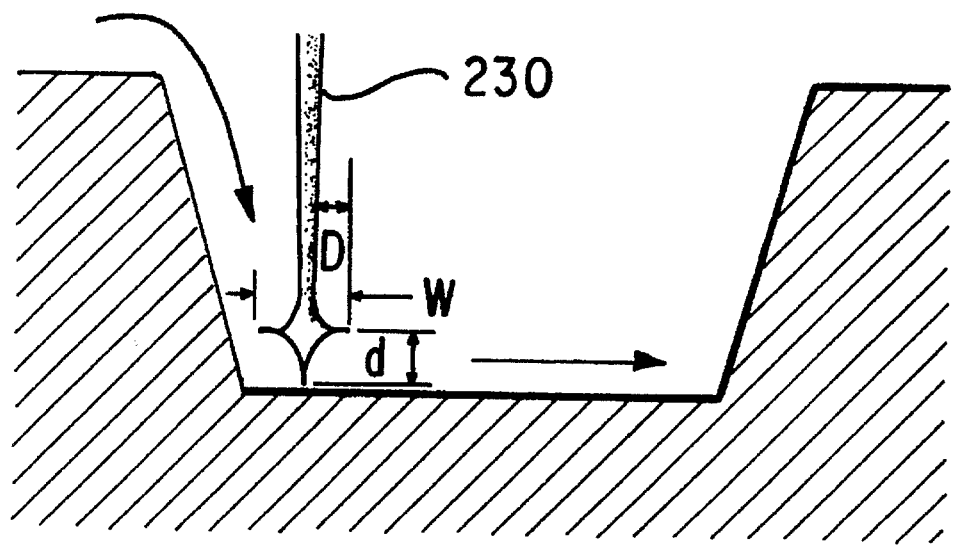
FIG. 7 is a side view of a three-point probe formed according to the present invention.

With reference to FIG. 7, a finished spike 230 formed according to the invention is shown disposed in a trench. The width w of the tip may be as small as 1,000 Å, the distance d may be as small as 500 Å, and the distance D may be as small 250 Å. Accordingly, the use of a tip having these dimensions allows for a more accurate profile of the trench.

Though CVD is used in the present invention, it is for the purpose of forming the masks, and is not used to create the finished spikes. Further, the carbon masks are substantially completely removed by the etching process. Accordingly, the present invention allows for formation of a finished three-point tip which is substantially free of carbon contamination. Further, the creation of spikes by removing silicon by etching may be controlled with greater accuracy than the creation of spikes by building up of deposited material. Thus, a three-point tip can be manufactured with greater accuracy so as to have smaller dimensions.

Figure 8:
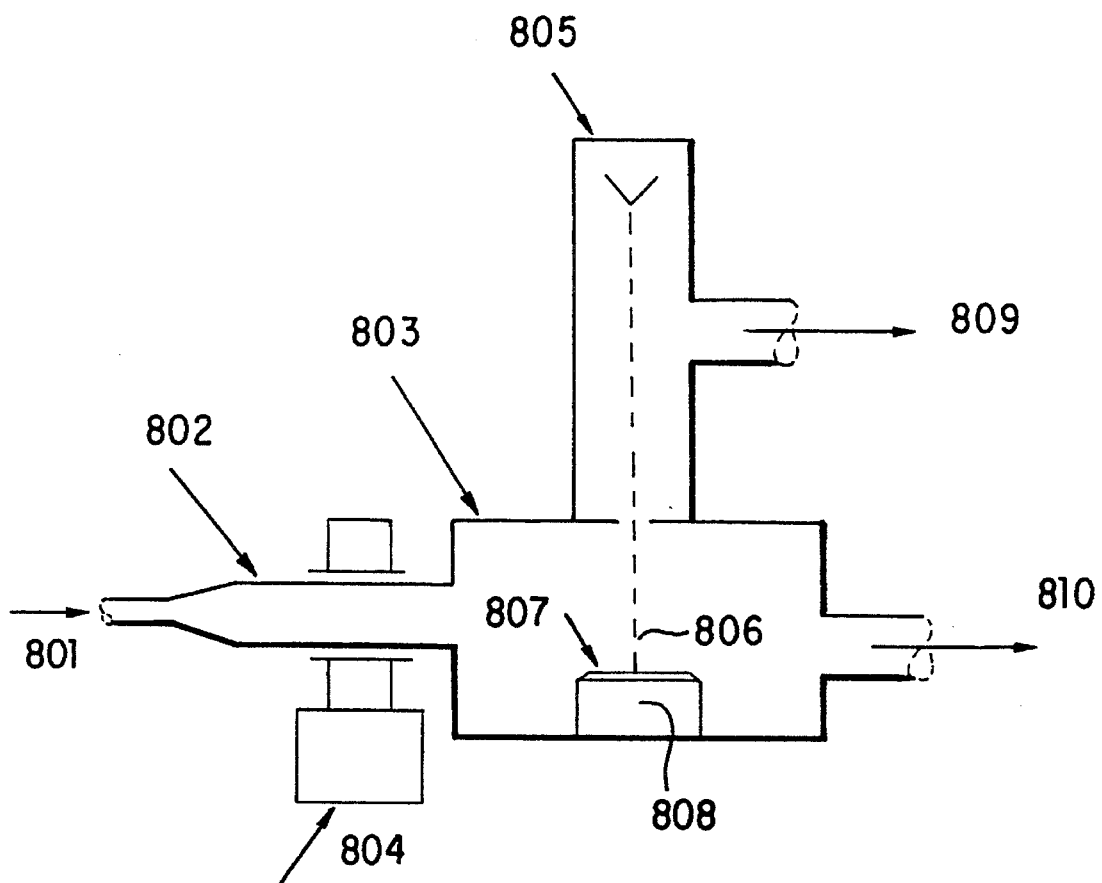
FIG. 8 is a diagram of an apparatus used to deposit the masks according to the method of the present invention.

With reference to FIG. 8, an apparatus 800 that may be used to deposit the three masks 40a, 40b, and 40c in the method according to the present invention includes a gas intake valve 801, a quartz tube 802, a microwave generator 804, and an etching chamber 803 in which a tip 807 is etched. An electron optical column 805 generates an electron beam 806 which impacts the tip 807 positioned on stage 808. The stage 808 has a rotation and tilt function which are used to position the tip 807 during etching to deposit the three masks 40a to 40c on the appropriate portion of the tip 807. Exhaust ports 809 and 810 are also provided from the shaft of electron optical column 805 and the etching chamber 803 respectively.

This invention has been described in detail in connection with the preferred embodiments. These embodiments, however, are merely for example only and the invention is not restricted thereto. It will be understood by those skilled in the art that other variations and modifications can easily be made within the scope of this invention as defined by the claims.

We claim:

1. A method for forming a three point atomic force microscope tip, the method comprising:

forming a substantially longitudinally extending solid silicon tip having a peripheral surface and a forward end surface;

forming three carbon masks upon the substantially longitudinally extending solid silicon tip, a first and second of said carbon masks formed along said peripheral surface, and a third of said carbon masks formed on the forward end surface;

etching said substantially longitudinally extending solid silicon tip for a first period of time to remove material from both said substantially longitudinally extending solid silicon tip and said carbon masks, wherein the removal of said material from said substantially longitudinally extending solid silicon tip and said carbon masks results in the formation of three spikes which are pointed at the location from which the carbon masks were removed.

2. The method recited in claim 1, said carbon masks formed by disposing the substantially longitudinally extending solid silicon tip in an atmosphere comprising a carbon based gas, and irradiating the substantially longitudinally extending solid silicon tip using an electron beam to form one said carbon mask at each location where the electron beam impinges upon the substantially longitudinally extending solid silicon tip.

3. The method recited in claim 2, the beam having a diameter of 500 Å.

4. The method recited in claim 2, the carbon based gas comprising $CF_4$.

5. The method recited in claim 4, the beam impinging upon the tip for approximately 15 minutes.

6. The method recited in claim 2, the substantially longitudinally extending solid silicon tip etched by a dry etching process.

7. The method recited in claim 6, the dry etching process comprising plasma etching.

8. The method recited in claim 7, the plasma etching performed in an atmosphere of $CF_4$ and $O_2$.

9. The method recited in claim 8, the atmosphere comprising a volume ratio for $CF_4$ and $O_2$ of 2.5:1.

10. The method recited in claim 6, the etching comprising ion etching.

11. The method recited in claim 2, the substantially longitudinally extending solid silicon tip etched by a wet etching process.

12. The method recited in claim 11, the wet etching comprising immersion in a solvent.

13. The method recited in claim 1, said substantially longitudinally extending solid silicon tip having a circular outer surface which tapers from a base towards the forward end surface.

14. The method recited in claim 13, the first and second of the masks formed approximately 500 Å from the end surface.

15. A method for forming a three point atomic force microscope tip, the method comprising:

forming a frustum-shaped solid silicon tip having a tapered outer peripheral surface and a forward end surface, the frustum-shaped solid silicon tip having a base opposite the forward end surface;

disposing the frustum-shaped solid silicon tip in an atmosphere of $CF_4$;

irradiating the tapered outer peripheral surface at a first location to thereby form a first carbon mask upon the tapered outer peripheral surface at the first location, the first location being closer to the forward end surface than to the base;

irradiating the tapered outer peripheral surface at a second location to form a second carbon mask upon the tapered outer peripheral surface at the second location, the second location disposed at a substantially opposite location of the tapered outer peripheral surface;

irradiating the forward end surface to form a third carbon mask upon the forward end surface;

etching the frustum-shaped solid silicon tip having the first, second and third carbon masks thereon for a first period of time, the etching causing the silicon of the tip to be removed in a parabolic manner at the location between the first mask and the third mask, the second mask and the third mask, the first mask and the base, and the second mask and the base to thereby from first, second and third spikes, wherein, the etching also removes the masks such that after the etching, each said spike has a point which coincides with the location of one of the masks before removal.

16. The method recited in claim 15, the carbon mask formed to have a disc shape with a diameter of 500 Å and a thickness of 10 Å.

17. The method recited in claim 16, the frustum-shaped solid silicon tip formed to have a diameter of 1,000 Å, at the base.

18. The method recited in claim 16, the first and second masks formed approximately 500 Å from the end of the frustum-shaped solid silicon tip.

19. The method recited in claim 18, the frustum-shaped solid silicon tip etched for a duration of 15 seconds.

20. The method recited in claim 19, the frustum-shaped solid silicon tip etched by plasma etching.

21. A method of forming a three-point tip for an atomic force microscope comprising;

forming a tapered silicon tip;

performing chemical vapor deposition to form carbon masks on said tapered silicon tip at selected locations;

performing etching to remove material from the tapered silicon tip with the carbon masks more resistive to the etching than the material such that at locations covered by the masks, the material is removed in a manner which undercuts the carbon masks, wherein at the end of etching, the carbon masks will be removed and the tapered silicon tip will have three spikes formed near one end.

22. The method recited in claim 21, the material comprising silicon.

23. The method recited in claim 22, the deposition and etching occurring in the same chamber.

* * * * *